US009446682B2

(12) United States Patent
Gauthier et al.

(10) Patent No.: US 9,446,682 B2
(45) Date of Patent: *Sep. 20, 2016

(54) METHOD OF OPERATING A PREEMPTIVE EV BATTERY PACK TEMPERATURE CONTROL SYSTEM

(71) Applicant: Atieva, Inc., Redwood City, CA (US)

(72) Inventors: Jean-Philippe Gauthier, San Francisco, CA (US); David Tse, Woodside, CA (US); Jieliang Hao, Palatine, IL (US); Peter Dore Rawlinson, Worcestershire (GB)

(73) Assignee: ATIEVA, INC., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/600,039

(22) Filed: Jan. 20, 2015

(65) Prior Publication Data

US 2016/0207416 A1 Jul. 21, 2016

Related U.S. Application Data

(63) Continuation-in-part of application No. 14/600,031, filed on Jan. 20, 2015.

(51) Int. Cl.
| | |
|---|---|
| *B60L 9/00* | (2006.01) |
| *B60L 11/18* | (2006.01) |
| *G01C 21/34* | (2006.01) |
| *G07C 5/08* | (2006.01) |

(52) U.S. Cl.
CPC .......... *B60L 11/1874* (2013.01); *G01C 21/343* (2013.01); *G07C 5/085* (2013.01)

(58) Field of Classification Search
USPC .......... 701/22; 180/207.3, 65.29, 65.1, 65.21
See application file for complete search history.

(56) References Cited

U.S. PATENT DOCUMENTS

| | | | |
|---|---|---|---|
| 7,795,841 B2 | 9/2010 | Matsumoto | |
| 7,940,028 B1* | 5/2011 | Hermann | H01M 16/006 320/104 |
| 2004/0182093 A1 | 9/2004 | Tanaka | |
| 2004/0185764 A1 | 9/2004 | Ichishi | |
| 2005/0274705 A1 | 12/2005 | Zhu | |
| 2009/0071178 A1 | 3/2009 | Major | |
| 2009/0085522 A1 | 4/2009 | Matsumoto | |
| 2011/0153140 A1 | 6/2011 | Datta | |
| 2011/0288701 A1* | 11/2011 | Chen | B60W 10/06 701/22 |
| 2011/0296855 A1* | 12/2011 | Johnston | B60L 3/0046 62/79 |
| 2012/0153718 A1* | 6/2012 | Rawlinson | H02K 5/20 307/10.1 |
| 2012/0262111 A1 | 10/2012 | Soong | |
| 2013/0110296 A1 | 5/2013 | Khoo | |
| 2013/0141212 A1 | 6/2013 | Pickering | |

(Continued)

*Primary Examiner* — Muhammad Shafi
(74) *Attorney, Agent, or Firm* — Patent Law Office of David G. Beck (57) ABSTRACT

A method of thermally pre-conditioning a vehicle's battery pack prior to vehicle departure is provided. The system, after determining that the vehicle is off and/or the driver has left the car, monitors a variety of conditions corresponding to both the vehicle and the driver in order to determine the probability of the driver requiring near-term use of the car. Typical monitored conditions may include driver and vehicle location, driver proximity, time of day, day of week, driver's upcoming appointments, and a historical data base that tracks driver behavior. Once the probability that the car will be needed within a preset time period exceeds a preset level, the system determines whether the battery pack should be heated or cooled based on the current battery pack temperature, and then activates an appropriate thermal management system.

19 Claims, 5 Drawing Sheets

(56) References Cited

U.S. PATENT DOCUMENTS

| | | |
|---|---|---|
| 2013/0168119 A1 | 7/2013 | Xu |
| 2013/0221916 A1* | 8/2013 | Kelty ............... B60L 11/187 320/109 |
| 2014/0070013 A1 | 3/2014 | Stanek |
| 2014/0338376 A1 | 11/2014 | Carpenter |
| 2015/0084759 A1* | 3/2015 | Stefan ............... B60N 2/26 340/438 |
| 2015/0360575 A1* | 12/2015 | Frank ............... B60L 11/1812 701/22 |
| 2016/0059733 A1 | 3/2016 | Hettrich |

* cited by examiner

METHOD OF OPERATING A PREEMPTIVE EV BATTERY PACK TEMPERATURE CONTROL SYSTEM

CROSS-REFERENCE TO RELATED APPLICATION

This application is a continuation-in-part of U.S. patent application Ser. No. 14/600,031, filed 20 Jan. 2015, the disclosure of which is incorporated herein by reference for any and all purposes.

FIELD OF THE INVENTION

The present invention relates generally to a vehicle's thermal management system and, more particularly, to a control system that predicts driver behavior in order to precondition the vehicle in preparation for use.

BACKGROUND OF THE INVENTION

Luxury vehicles offer a number of user amenities that provide the driver with a more enriching experience, and typically one which attempts to cater to each driver and their particular wants and needs. For example, many cars allow the driver to select between multiple driving modes by simply rotating a knob or pushing a button, where each driving mode alters a variety of vehicle characteristics ranging from throttle response to suspension set-up. Commonly used driving modes include normal, economy and sport. Another feature that has become commonplace among luxury vehicles is the ability to preset and memorize the various aspects of the driver's seat, e.g., seat position, seat height, seatback incline, lumbar support, seat cushion angle and seat cushion length. Once preset, recorded in memory and assigned to a particular user, the preset settings may be re-obtained by simply pushing a button within the car or activating the car with a user assigned key fob. Outside mirrors and steering wheel position may also be linked to the same memory, thus allowing the vehicle to automatically adjust the driver's seat, steering wheel and mirror placement once a particular driver is identified.

In addition to providing the driver with a customized driving experience, both in terms of driving style and driver position, many car manufacturers strive to provide the driver with a luxurious cabin. As such, luxury vehicles often surround passengers with leather and exotic wood while using premium audio systems to insure passenger comfort. Additionally, some vehicles allow the user to pre-heat or pre-cool the passenger cabin, for example using a smartphone application. Unfortunately, many car owners simply forget to use this feature. Therefore what is needed is a system that can predict when the driver will be using their car and pre-cool or pre-heat the car accordingly. The present invention provides such a system.

SUMMARY OF THE INVENTION

The present invention provides a method of activating a thermal management system that is coupled to a battery pack mounted within a vehicle, the method comprising the step of monitoring an operational state of the vehicle, where the vehicle is on when the operational state corresponds to a first state, where the vehicle is off when the operational state corresponds to a second state, and where when the operational state corresponds to the second state the method further comprises the steps of (i) monitoring a plurality of conditions, where the plurality of conditions are selected from the group consisting of a driver location, a direction of driver movement relative to the vehicle, a vehicle location, a separation distance between the vehicle and the vehicle's driver, a current time of day, a current day of week, a driver appointment schedule, a historical data base, and an alarm clock, where the monitoring step is performed by a system controller incorporated into the vehicle; (ii) determining a probability of the vehicle departing from the vehicle's present location within a preset number of minutes from the current time based on the plurality of conditions monitored by the system controller; and (iii) comparing the probability to a preset probability, where if the probability is less than the preset probability the system controller continues to perform the steps of monitoring the plurality of conditions, determining the probability and comparing that probability to the preset probability, where these steps are performed for as long as the operational state of the vehicle remains within the second state, and where if the probability is greater than the preset probability the system controller performs the step of activating the thermal management system. The method may include the step of providing a user interface coupled to the system controller, where the preset number of minutes and/or the preset probability may be set by a user via the user interface.

The step of monitoring the operational state of the vehicle may include the step of (i) monitoring a vehicle on/off switch, and/or (ii) monitoring proximity of the vehicle's driver to the vehicle, where the operational state corresponds to the first state when the driver is within the passenger cabin of the vehicle and corresponds to the second state when the driver is outside of the passenger cabin.

The driver's location may be monitored by monitoring the location of a smartphone (e.g., the driver's smartphone).

The driver's appointment schedule may be monitored by the system controller by synchronizing an on-board calendar with a calendar contained on a remote system, where the remote system may consist of a cellular phone, a laptop computer, a tablet computer, a personal digital assistant, a computer system, or a network-based computing system. The calendar may include a plurality of successive appointments spanning a period of time, where each appointment has a corresponding start time. The step of synchronizing the on-board calendar with the calendar contained on the remote system may be performed when the remote system is plugged into an on-board port coupled to the system controller. The step of synchronizing the on-board calendar with the calendar contained on the remote system may be performed when a link is established between the remote system and the system controller.

The method may further include the step of maintaining the historical data base, where the historical data base includes a plurality of departure times and a plurality of time durations, wherein the plurality of departure times corresponds to a first plurality of locations, and where each time duration corresponds to a duration period of the vehicle residing at one of a second plurality of locations.

The step of activating the thermal management system may include the steps of monitoring an elapsed time and comparing that elapsed time to a preset time interval, where the elapsed time corresponds to the length of time that the thermal management system is active, and where the system controller is configured to terminate activation of the thermal management system when the elapsed time exceeds the preset time interval.

The step of activating the thermal management system may include the steps of determining a current battery pack temperature and comparing that temperature to a preset temperature, where the step of activating the thermal management system may further include the step of activating a battery pack heater if the current battery pack temperature is less than said preset temperature. The step of activating a battery pack heater may include the step of circulating heated air throughout the battery pack. The step of activating a battery pack heater may include the step of activating a heater coupled to a coolant circulation system and activating a coolant circulation pump, where the coolant circulation system is thermally coupled to the battery pack. The step of activating a heater coupled to a coolant circulation system may include the steps of (i) monitoring an elapsed time and (ii) comparing that elapsed time to a preset time interval, where the elapsed time corresponds to the length of time that the heater is active, and where the system controller is configured to terminate activation of the heater while continuing to activate the coolant circulation pump for a preset period of time if the elapsed time exceeds the preset time interval.

The step of activating the thermal management system may include the steps of determining a current battery pack temperature and comparing that temperature to a preset temperature, where the step of activating the thermal management system may further include the step of cooling the battery pack if the current battery pack temperature is higher than said preset temperature. The step of cooling the battery pack may include the step of activating a battery pack air circulation system. The step of cooling the battery pack may include the steps of activating a chiller coupled to a coolant circulation system and activating a coolant circulation pump, where the coolant circulation system is thermally coupled to the battery pack. The step of cooling the battery pack may include the steps of (i) monitoring an elapsed time and (ii) comparing that elapsed time to a preset time interval, where the elapsed time corresponds to the length of time that the cooling system is active, and where the system controller is configured to terminate activation of the cooling system while continuing to activate the coolant circulation system for a preset period of time if the elapsed time exceeds the preset time interval.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to an assembly of one or more batteries electrically interconnected to achieve the desired voltage and capacity, where the battery assembly is typically contained within an enclosure. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
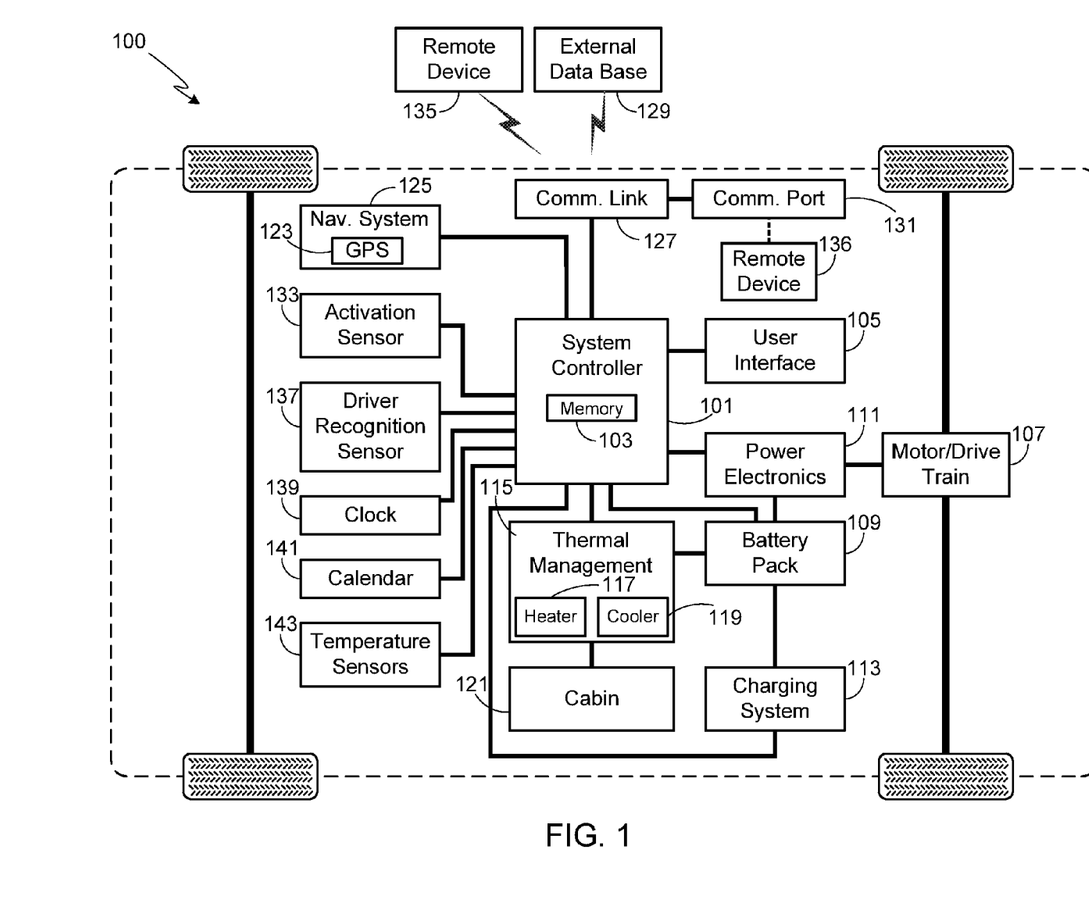
FIG. 1 provides a system level diagram of the primary vehicle systems utilized in at least one embodiment of the invention.
Figure 2:
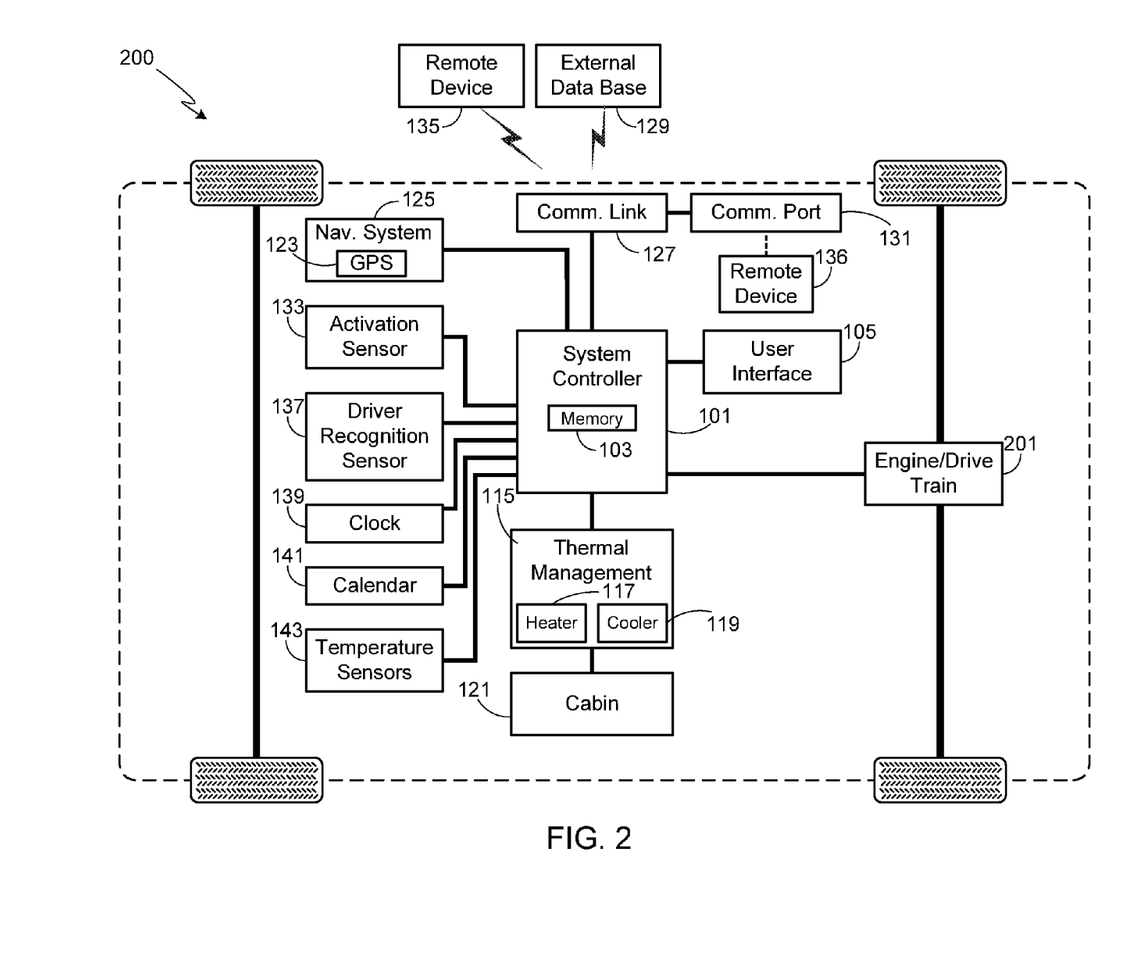
FIG. 2 provides a system level diagram of the primary systems utilized in at least one embodiment of the invention in which the system is integrated into an ICE-based vehicle.

FIG. 1 is a high-level view of a vehicle 100 and the primary vehicle systems used to predict driver behavior and prepare the passenger cabin and/or the vehicle's battery pack for future use in accordance with the invention. As described in further detail below, the system of the invention may also be used to control the temperature of the passenger cabin without regard to the temperature of the batteries, for example in a vehicle utilizing an internal combustion engine (ICE), or to control the temperature of the battery pack without regard to the temperature of the passenger cabin. FIG. 2 provides a high-level view of an ICE-based vehicle 200 in which the system of the invention is only used to control cabin temperature. It should be understood that the system configurations illustrated in FIGS. 1 and 2 are simply exemplary configurations and that other vehicle configurations may be used while still retaining the functionality of the invention. Additionally, one or more of the elements shown in either FIG. 1 or FIG. 2 can be grouped together in a single device, and/or circuit board, and/or integrated circuit.

Vehicle 100 includes a vehicle system controller 101, also referred to herein as a vehicle management system, which is comprised of a central processing unit (CPU). System controller 101 also includes memory 103, with memory 103 being comprised of EPROM, EEPROM, flash memory, RAM, solid state drive, hard disk drive, or any other type of memory or combination of memory types. A user interface 105 is coupled to vehicle management system 101. Interface 105 allows the driver and/or a passenger to interact with the vehicle management system, for example inputting data into the navigation system, altering the heating, ventilation and air conditioning (HVAC) system, controlling the vehicle's entertainment system (e.g., radio, CD/DVD player, etc.), adjusting vehicle settings (e.g., seat positions, light controls, etc.), and/or otherwise altering the functionality of vehicles 100/200. In at least some embodiments, interface 105 also includes means for the vehicle management system to provide information to the driver and/or passenger, information such as a navigation map or driving instructions as well as the operating performance of any of a variety of vehicle systems (e.g., battery pack charge level for an EV, fuel level for an ICE-based or hybrid vehicle, selected gear, current entertainment system settings such as volume level and selected track information, external light settings, current vehicle speed, current HVAC settings such as cabin temperature and/or fan settings, etc.). Interface 105 may also be used to warn the driver of a vehicle condition (e.g., low battery charge level or low fuel level) and/or communicate an operating system malfunction (battery system not charging properly, low oil pressure for an ICE-based vehicle, low tire air pressure, etc.). Interface 105 may be comprised of a single interface, for example a touch-screen display, or a combination of user interfaces such as push-button switches, capacitive switches, slide or toggle switches, gauges, display screens, warning lights, audible warning signals, etc. It will be appreciated that if user interface 105 includes a graphical display, controller 101 may also include a graphical processing unit (GPU), with the GPU being either separate from or contained on the same chip set as the CPU.

Vehicle 100 includes one or more motors 107 that provide vehicle propulsion. Motor(s) 107 may be mechanically coupled to the front axle/wheels, the rear axle/wheels, or both, and may utilize any of a variety of transmission types (e.g., single speed, multi-speed) and differential types (e.g., open, locked, limited slip). Battery pack 109, which may be comprised of one or hundreds or thousands of rechargeable batteries, supplies the power necessary for operation of motor(s) 107. Additionally, battery pack 109 may provide the power necessary for the various vehicle systems that require electrical power (e.g., lights, entertainment systems, navigation system, etc.). Typically battery pack 109 is coupled to motor(s) 107 via a power control system 111 that insures that the power delivered to the drive motor is of the proper form (e.g., correct voltage, current, waveform, etc.).

Battery pack 109 is charged by charging system 113. Charging system 113 may either be integrated into vehicle 100 as shown, or be comprised of an external charging system. Typically charging system 113 is configured to be electrically connected to an external power source, not shown, such as a municipal power grid. Battery pack 109 may also be charged, at least in part, using an on-board charging system such as a regenerative braking system.

Vehicles 100/200 include a thermal management system 115 that includes both a heating subsystem 117 and a cooling subsystem 119. Thermal management system 115 may be used to maintain the passenger cabin 121 within the desired temperature range as well as to insure that the batteries within battery pack 109 are maintained within the batteries' desired operating, charging and/or storage temperature ranges. When system 115 is used to control the temperature of battery pack 109, the system may utilize heated or cooled air, circulating the heated or cooled air throughout the battery pack; alternately, a coolant circulation system may be thermally coupled to the battery pack, where the coolant is heated by heater 117 or cooled by cooler 119 as required. Exemplary coolant-based battery pack thermal management systems are disclosed in co-assigned U.S. patent application Ser. No. 14/148,933, filed 7 Jan. 2014, Ser. No. 14/340,606, filed 25 Jul. 2014, and Ser. No. 14/519,182, filed 21 Oct. 2014, the disclosures of which are incorporated herein for any and all purposes.

A global positioning system (GPS) 123 is incorporated into vehicles 100/200, thereby allowing the location of the vehicle to be tracked. GPS 123 may be a stand-alone system or, as preferred, integrated into a navigation system 125.

Coupled to vehicle management system 101 is a communication link 127. Communication link 127 may be used to wirelessly obtain configuration updates, location data or other information from an external data source 129 (e.g., manufacturer, dealer, service center, web-based application, remote home-based system, third party source, etc.) using any of a variety of different technologies (e.g., GSM, EDGE, UMTS, CDMA, DECT, WiFi, WiMax, etc.). In some embodiments, communication link 127 may also include an on-board port 131, such as a USB, Thunderbolt, or other port, in order to receive updates and information over a wired communication link.

The two exemplary vehicle configurations illustrated in FIGS. 1 and 2 are substantially the same except for the replacement of motor 107 in vehicle 100 with an engine 201 in vehicle 200. Due to the use of engine 201, vehicle 200 does not include battery pack 109, power electronics subsystem 111 or charging system 113. It should be understood that the invention is equally applicable to a hybrid vehicle.

In accordance with the invention and as described in detail below, system controller 101 monitors a variety of conditions corresponding to both the vehicle and the driver in order to predict when the driver is likely to want to use the car. Once the probability of the driver using the car exceeds a preset level, system controller 101 can be configured to perform various tasks to automatically prepare the vehicle for use. Typically, and as described below, these tasks include adjusting cabin temperature and, assuming the vehicle is an EV, adjusting battery pack temperature.

Figure 3A:
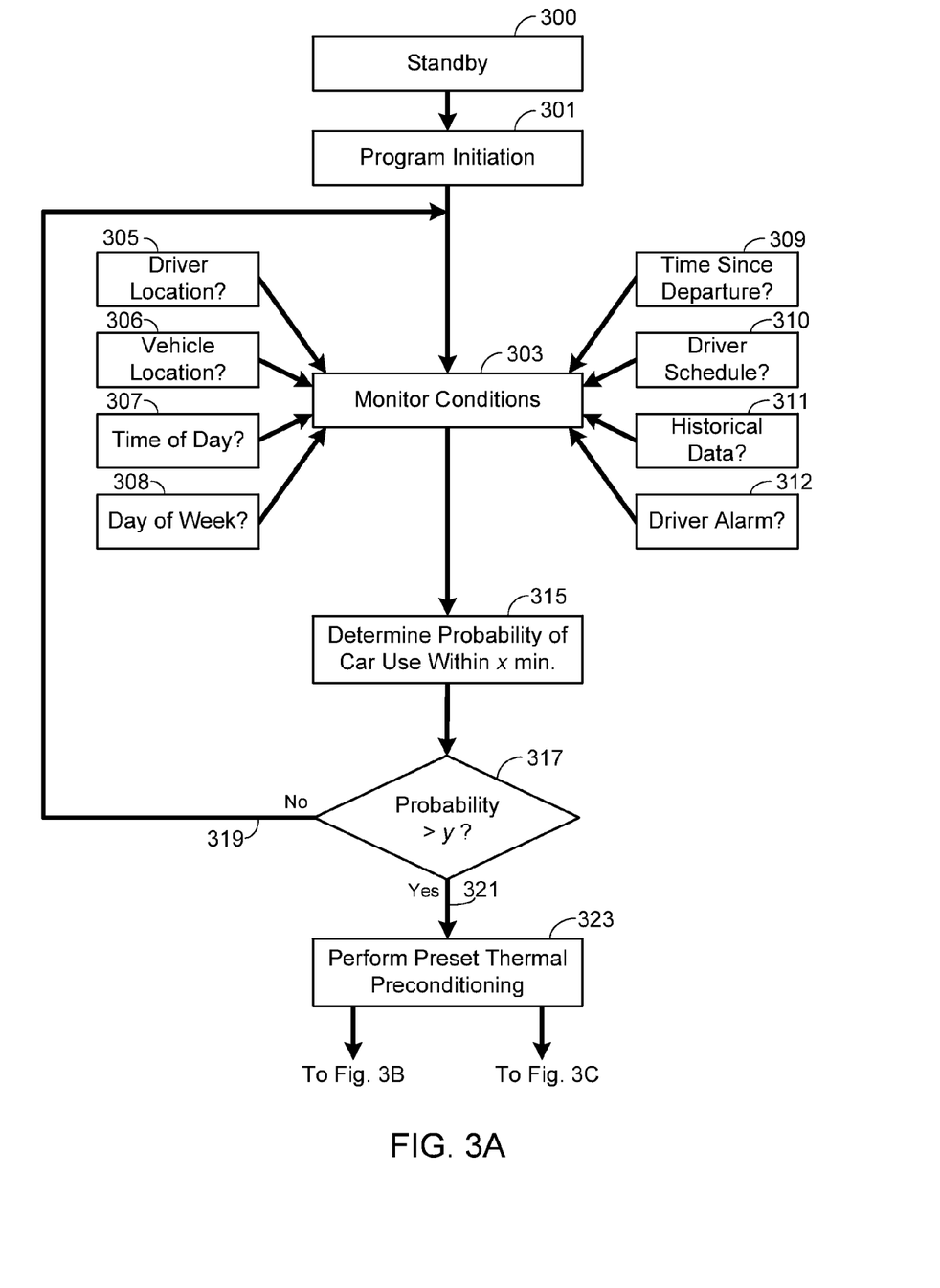
FIGS. 3A-3C illustrate the basic methodology of the invention in accordance with a preferred embodiment.
Figure 3B:
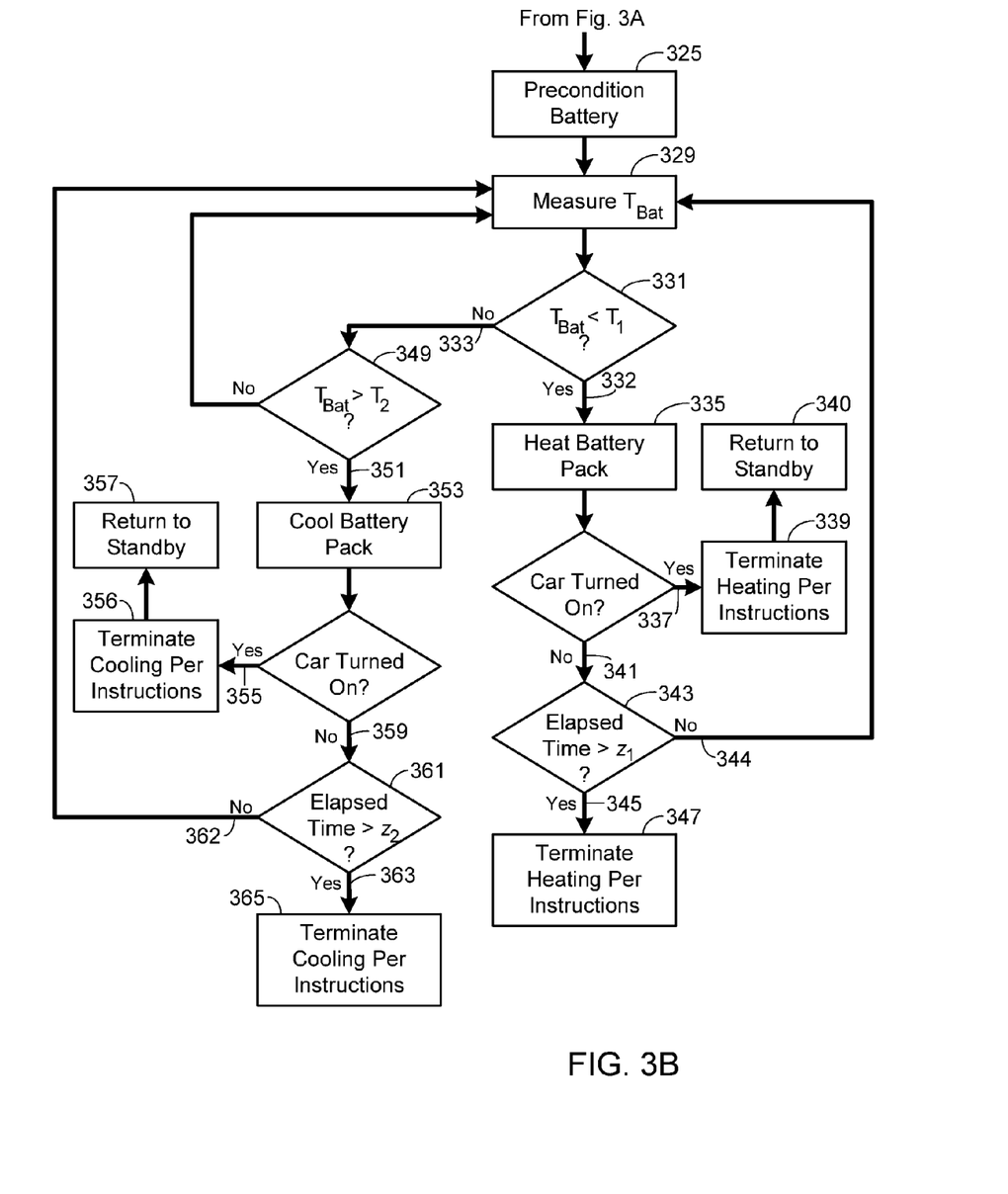
Figure 3C:
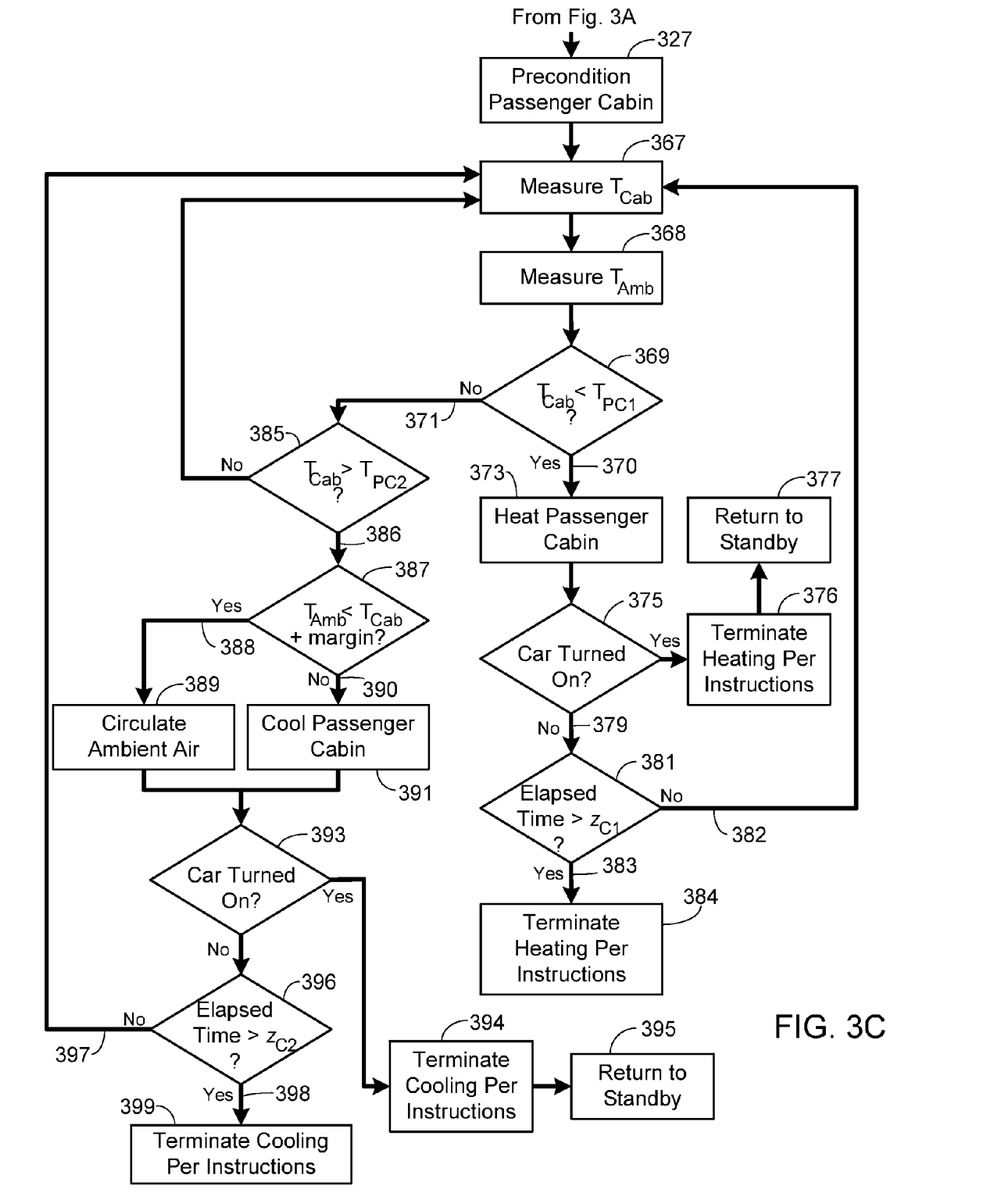

FIGS. 3A-3C illustrate the basic methodology of the invention in accordance with at least one embodiment of the invention. During normal operation of the car, the process is in standby (300). The process is initiated (step 301) when the vehicle is parked and the driver leaves the vehicle. System controller 101 can monitor any of a variety of conditions to determine when step 301 is achieved. For instance, controller 101 can monitor the operational state of the car, i.e., whether the car is currently on or off, using a sensor 133. Sensor 133 may correspond to an ignition switch (e.g., ICE-based vehicle) or a simple on/off switch (e.g., EV). Alternately, driver proximity to the vehicle may be monitored and used to determine when to initiate the process of the invention (step 301). For example, when the driver is within close proximity to the vehicle, a short range link may be established between the vehicle's communication link 127 and a user device 135. Once that link is disrupted or the distance between the driver and the vehicle is determined to exceed a preset distance, then the process can be initiated (step 301). User device 135, for example the driver's key fob or a smart phone, preferably provides a unique signature for each driver, thereby allowing a specific driver to be identified. The wireless link can be established using a radio-frequency identification (RFID) system, Bluetooth wireless technology, or a similar short range wireless technology. Alternately, controller 101 can determine driver proximity based on whether or not a wired link has been established between on-board port 131 and the user's cellular phone (e.g., smartphone) or other compatible device 136, i.e., step 301 may be based on when the user unplugs device 136 from port 131. Alternately, the system may use a driver recognition system 137, e.g., a facial or voice recognition system or weight sensors located in the driver's seat, to determine whether or not there is a driver seated in the car.

Once the process of the invention has been initiated, the system monitors a variety of conditions that may be used to predict when the driver is likely to return to the car. (Step 303). Conditions that may be monitored during step 303 include:

Driver Location (step 305)—Driver location is preferably monitored, for example by monitoring the location of the driver's cellular phone (e.g., smartphone). Of particular importance is the proximity of the driver to the car as well as the direction of driver movement, i.e., whether the driver is moving towards the car or away from the car.

Vehicle Location (step 306)—Since vehicle location is a useful indicator of expected driver behavior, the current location of the car is monitored using GPS 123. Typically a data base, for example external data base 129 or an internal data base stored in memory 103, is used to identify the location of the vehicle based on its coordinates as determined by GPS 123. Exemplary locations include the driver's residence, driver's work facility, shopping center, charging station, restaurant, gym, golf course, residence frequented by the driver, etc.

Time of Day (step 307)—Controller 101 uses an internal clock 139 to monitor the time of day.

Day of Week (step 308)—Controller 101 uses an internal calendar 141 to determine the current day of the week.

Time Since Driver Departure (step 309)—Controller 101 uses internal clock 139 to track the length of time that the driver has been away from the car.

Driver Schedule (step 310)—Preferably controller 101 has access to the driver's schedule, which provides an indicator of when the driver is likely to require their car. Schedule information may be obtained in a variety of ways. In one technique, when the user plugs their cellular phone (e.g., smartphone) or other compatible device 136 into port 131, the system automatically synchronizes the calendar on the user's device with an on-board driver calendar. Alternately, when the user comes into close proximity to the vehicle a short range link is established between the user's cellular phone (e.g., smartphone) or other compatible device and the on-board system using communication link 127, thereby allowing controller 101 to synchronize the calendar on the user's device with the on-board driver calendar. Alternately, controller 101 may be configured to periodically (e.g., once per day, once per hour, etc.) connect via communication link 127 with a remote system (e.g., smartphone, tablet, personal digital assistant (PDA), home computer, work computer, network-based computing system, etc.) that contains the driver's schedule, thereby allowing synchronization between the driver's schedule and the on-board driver calendar.

Historical Data Base (step 311)—Controller 101 preferably maintains a data base, either stored on-board in memory 103 or stored remotely and accessed via communication link 127, that tracks driver behavior. Exemplary driver behavior may include departure times from a particular location (e.g., home, work, friend's house, etc.) for a particular day of the week. Driver behavior may also include the length of time that the vehicle/driver remains at a particular location (e.g., restaurant, gym, golf course, grocery store, shopping center, charging station, etc.).

Driver Alarm (step 312)—Preferably controller 101 has access to the driver's alarm clock, thus allowing the controller to predict car usage based on the alarm setting and historical data.

Based on the current monitored conditions as well as historical data, controller 101 determines a probability of vehicle 100/200 being used within a preset time period, i.e., within x minutes from the current time (step 315). It should be understood that the invention is not limited to a particular weighting function; rather the system may be configured to weight monitored conditions as well as various combinations of monitored conditions in a variety of ways. For example:

1) If the car is at a known or determinable location, the system may use a pre-assigned time duration for the driver to remain at that particular location, after which it is expected that the driver will re-enter the car and drive away. For example, 1 hour may be pre-assigned for a grocery store, 2 hours may be pre-assigned for a gym, 1.5 hours may be pre-assigned for a restaurant, 5 hours may be pre-assigned for a golf course, etc. The probability that the car will be used can then be set to increase at a predetermined rate based on how long the driver/vehicle has been at that location. For example, if the car has been located at the grocery store for 5 minutes, based on the above pre-assigned duration of 1 hour for a grocery store, the probability that the car will be needed in the next 10 minutes can be set to a very low value. This value would then be set to increase the longer that the car remains at that particular location. After the car has been located at the grocery store for 50 minutes, the probability is quite high that the car will be driven within 10 minutes based on the pre-assigned time duration of 1 hour.

2) If the car is at a known or determinable location, the system may use historical data to determine how long the driver/vehicle is likely to remain at that location. Furthermore, as more data for a particular location is accumulated, this data can be given greater weight, assuming that the data is consistent. Thus, for example, if the driver/vehicle has been at location "A" 4 times and has stayed at that location each time between 5 minutes and 2 hours, little significance can be given to this data given the small number of samples and the spread of the data for those samples. As a result, the ability to predict the duration at that location is low given this historical data. In contrast, if the driver/vehicle has been at that same location 100 times and has always stayed there for a time period between 55 minutes and 65 minutes, the significance of this data is quite high as is the ability of the system to predict when the car will depart from that location. Assuming that the historical data shows a trend, for example as described above, then the system can set an expected departure time and set probabilities based on how long the car has been at that location, i.e., when the car first arrives at the location the probability is quite low and thereafter increases.

3) The system can also use historical data to predict departure times for a 'class' of locations. For example, by recognizing that the car is parked at a particular type of establishment, e.g., a movie theater, the system can build up a data base for that type of location. Then, assuming that the data base shows consistent data for that class of location, the system can assign a relatively high probability value that the car will depart from that type of location after a certain period of time. As a result, when the driver parks at a new location of that same class of location, e.g., a new movie theater, the controller can use historical data taken when the car has been parked at other locations of the same class, e.g., other movie theaters, to predict when the car is likely to depart.

4) As previously noted, in at least one embodiment controller 101 obtains a calendar of the driver's appointments, for example taken from the user's smartphone or PDA. Utilizing the driver's appointment calendar, controller 101 can determine when a driver has an upcoming appointment and then prepare the vehicle a suitable length of time in advance of the appointment so that the car is ready to depart when needed. In one configuration the system pre-assigns how much time is required to arrive at the appointment on time and then assumes that the car should be ready to depart at that time, e.g., if the appointment is at 2:00 PM and the controller assigns 30 minutes for the drive, then the controller would assume that the car should be ready to drive at 1:30 PM. In an alternate configuration, controller 101 uses historical data gathered when the car previously traveled to the same appointment location to determine how much travel time should be allotted and therefore when the car should be prepared to depart. In yet another configuration, controller 101 determines expected travel time, and thus expected departure time, based on the distance between the appointment location and the vehicle's current location.

5) If controller 101 has access to the driver's alarm clock, for example if the driver uses the alarm function of their smartphone and the smartphone is either currently linked to the controller, for example using wireless link 127, or the smartphone was previously linked to controller 101 after the alarm function had been set, then the control system can be configured to prepare the car for use based on the alarm setting. For example, the system can be configured to expect that the car will be driven between 30 and 45 minutes after the alarm setting, and can therefore be set to have the car prepared within 30 minutes of the alarm setting. Alternately, the system can estimate the time span between the alarm setting and the driver's departure based on historical data, i.e., how long it has taken in the past for the driver to depart from a location (e.g., home) after the alarm setting.

6) Historical data can also be used by the controller, either alone or in conjunction with other monitored conditions, to predict departure times. For example, even though the user may not use an alarm, they may always depart from the same location (e.g., home, work, etc.) at the same time each day, Monday through Friday, plus or minus 10 minutes. In this scenario, controller 101 is able to use the historical data to predict departure time whenever the vehicle is located at that same location.

7) Historical data, in combination with the current day/time, can also be used by the controller to predict departure times. For example, regardless of where the car is parked, the driver may always use the car at a set time (e.g., 2:50) to perform a specific task (e.g., pick up their children from school). In this scenario, controller 101 is able to use the historical data to predict departure time regardless of vehicle location and prepare the vehicle accordingly.

8) Driver location (step 305) and vehicle location (step 306) may also be used by controller 101 to predict departure time, thus allowing the system to prepare the car in advance of departure. For example, historical data accumulated by the controller may indicate that if the driver is not at home, 99 percent of the time whenever the driver is within 100 meters of the car the driver uses the car within 10 minutes. In such a scenario, controller 101 could be configured to begin car preparation whenever the driver is within 100 meters of the car. Preferably the system is configured to increase probability based on this distance, e.g., if the separation distance between the driver and the car is greater than 2000 meters, a 0 percent probability of a near-term departure could be assigned; if the separation distance between the driver and the car is less than 1000 meters, a 50 percent probability of a near-term departure could be assigned; if the separation distance between the driver and the car is less than 250 meters, a 75 percent probability of a near-term departure could be assigned; and if the separation distance between the driver and the car is less than 100 meters, a 99 percent probability of a near-term departure could be assigned.

Once controller 101 determines the probability that the car will depart within a certain number of minutes, x, of the current time (step 315), then this probability is compared to a preset probability value, y (step 317). If the probability of a near term departure is too low, i.e., the probability calculated by the controller is less than y (step 319), then the system returns to condition monitoring step 303. If the probability of a near term departure is greater than the preset probability value, y (step 321), then controller 101 performs the thermal conditioning preset by the manufacturer, driver or third party (step 323).

In accordance with the invention, after the system determines that the probability of a near term departure is greater than the preset probability value (step 321), the controller 101 is configured to either thermally prepare the battery pack (step 325), for example if the vehicle is an EV, thermally prepare the passenger cabin (step 327), or both. It should be understood that while the process illustrated in FIGS. 3A-3C include both battery pack and passenger cabin thermal conditioning, the process of the invention may be configured to only incorporate one of these thermal conditioning procedures as previously noted.

If the system is configured to thermally condition the battery pack (step 325) once the probability of the driver utilizing the car within a preset time period (e.g., next 10 minutes, next 20 minutes, next 30 minutes, etc.) is greater than a preset probability, the controller 101 determines the battery pack temperature using a temperature sensor 143 (step 329) and compares that temperature to a preset temperature, $T_1$ (step 331). If the battery pack temperature is too low (step 332), then heat is applied to the batteries (step 335). The batteries may be heated by heating a thermal transfer fluid (e.g., water) contained within cooling conduits in thermal communication with the batteries and then circulating that thermal transfer fluid within the cooling conduits. Alternately, the batteries may be heated by circulating heated air within the battery pack. It will be appreciated that other means may be used to heat the batteries within the battery pack.

After battery heating has been initiated (step 335), controller 101 monitors the car to determine if the car has been started or otherwise turned on by the driver. If the car is turned on (step 337), then the system controller terminates battery pack heating in accordance with preset instructions (step 339) and returns to the stand-by mode (step 340). If the car has not yet been turned on (step 341), then the system controller 101 monitors the time and compares the elapsed time since the initiation of heating to a preset time interval, $z_1$ (step 343). As long as the elapsed time is less than the preset time interval (step 344) the system continues to monitor battery temperature and heat the batteries as necessary. If, however, the elapsed time exceeds the preset time interval (step 345), then battery heating is terminated (step 347). Even after battery heating is terminated, in at least one embodiment the circulation of the thermal transfer fluid continues for a preset time period, thus helping to maintain the elevated battery temperature.

In step 331, if the battery pack temperature is determined to be greater than preset temperature $T_1$ (step 333), then the battery pack temperature is compared to a second preset temperature, $T_2$, to determine if the battery temperature is too high (step 349). If the battery pack temperature is too high (step 351), then the batteries are cooled (step 353). The batteries may be cooled by circulated a cooled thermal transfer fluid contained within the cooling conduits that are in thermal communication with the batteries. Alternately, the batteries may be cooled by circulating cooled air within the battery pack. It will be appreciated that other means may be used to lower the temperature of the batteries within the battery pack.

After battery cooling has been initiated (step 353), controller 101 monitors the car to determine if the car has been started/turned on. If the car is turned on (step 355), then the system controller terminates battery pack cooling in accordance with preset instructions (step 356) and returns to the stand-by mode (step 357). If the car has not yet been turned on (step 359), then the system controller 101 monitors the time and compares the elapsed time since the initiation of cooling to a preset time interval, $z_2$ (step 361). The preset time interval used in step 361 may be the same interval as used in step 343, or a different time interval. If the elapsed time is less than the preset time interval (step 362), the system continues to monitor battery temperature and cool and/or heat the batteries as necessary. If, however, the elapsed time exceeds the preset time interval (step 363), then battery cooling is terminated (step 365). After battery cooling is terminated, in at least one embodiment the circulation of the thermal transfer fluid continues for a preset time period.

In the embodiment illustrated in FIGS. 3A-3C and as described above, active heating and/or cooling of the battery pack is terminated after a preset time period has been exceeded (e.g., steps 347 and 365). These steps prevent excessive power drain on the vehicle in those instances where the control system misinterprets the monitored conditions or miscalculates the time at which the vehicle will be required. In some cases the control system may have properly interpreted the monitored conditions and properly calculated the departure time, however the driver is delayed.

As described above, the system of the invention may also be used to thermally precondition the passenger cabin (step 327), either in addition to thermally preconditioning the battery pack or in lieu of thermally preconditioning the battery pack. Initially, after the system determines that the probability of a near term departure is greater than the preset probability value (step 321), the passenger cabin temperature is determined (step 367) as is the ambient temperature outside of the vehicle (step 368). Next the passenger cabin temperature is compared to a preset temperature, $T_{PC1}$ (step 369). If the passenger cabin temperature is too low (step 370), passenger cabin heating is performed (step 373). Passenger cabin heating may be performed by activating the heat mode of the vehicle's HVAC system. Alternately, seat and/or steering wheel heaters may be activated. Alternately, both the vehicle's HVAC heating system and the seat and/or steering wheel heaters may be activated. In a preferred embodiment, in addition to activating a heating system, a cabin air circulation system is activated in order to circulate the warmed air throughout the passenger cabin.

As described previously, after initiating heating the system controller monitors the car for indications that the car has been started or otherwise turned on (step 375). If the car is turned on, then the system controller terminates battery pack cooling in accordance with preset instructions (step 376) and returns to the stand-by mode (step 377). If the car has not yet been turned on (step 379), then the system controller 101 monitors the time and compares the elapsed heating time to a preset time interval, $z_{c1}$ (step 381). As long as the elapsed time is less than the preset time interval (step 382) the system continues to monitor passenger cabin temperature and heat the cabin as necessary. If, however, the elapsed time exceeds the preset time interval (step 383), then cabin heating is terminated (step 384). Even after cabin heating is terminated, in at least one embodiment the cabin air circulation system is kept on for a preset length of time, thus helping to maintain the elevated cabin temperature.

In step 369, if the passenger cabin temperature is determined to be greater than preset temperature $T_{PC1}$ (step 371), then the cabin temperature is compared to a second preset temperature, $T_{PC2}$, to determine if the cabin temperature is too high (step 385). If the cabin temperature is too high (step 386), then passenger cabin cooling is employed. In at least one preferred embodiment, the first step of cabin cooling is to compare the cabin temperature with the external air temperature (step 387). If the ambient air temperature is lower than the cabin temperature by a sufficient margin (step 388), then external air is circulated throughout the passenger cabin (step 389). If the passenger cabin temperature is greater than preset temperature $T_{PC1}$ (step 371) and preset temperature $T_{PC2}$ (step 386), and if the external temperature is not low enough to rely on ambient air circulation alone (step 390), then active cooling of the passenger cabin is used (step 391). Typically the vehicle's HVAC system is used to actively cool the passenger cabin.

After initiating cabin cooling, either by circulating ambient air through the cabin (step 389) or employing an active cooling system such as the vehicle's HVAC system (step 391), then the system controller monitors to determine whether or not the driver has returned and started the car (step 393). If the car is turned on, then the system controller terminates passenger cabin cooling in accordance with preset instructions (step 394) and returns to the stand-by mode (step 395). If the car has not yet been turned on, then the system controller 101 monitors the time and compares the elapsed cooling time to a preset time interval, $z_{c2}$ (step 396). As long as the elapsed time is less than the preset time interval (step 397) the system continues to monitor passenger cabin temperature and cool the cabin as necessary. If, however, the elapsed time exceeds the preset time interval (step 398), then cabin heating is terminated (step 399). Even after cabin cooling is terminated, in at least one embodiment the cabin air circulation system is kept on for a preset length of time, thus helping to maintain the lower cabin temperature.

While FIGS. 3A-3C and the description above provide details of a preferred embodiment of the invention, it should be understood that variations of this methodology are possible without departing from the scope and intent of the invention. Many of these variations are due to the specifics of the vehicle in which the invention is to be used. For example, the techniques used to cool and/or heat the passenger cabin will depend upon the details of the vehicle's HVAC system. While some vehicles may utilize a rather simple HVAC system in which heated or cooled air is circulated through the passenger cabin, many luxury vehicles utilize a significantly more complex HVAC system that lends itself to a variety of heating and cooling scenarios. For instance, some vehicles may include (i) separate fans for different regions of the passenger cabin (e.g., front versus rear portions of the cabin, driver versus passenger portions of the cabin, etc.); (ii) multiple temperature controllers for different regions of the passenger cabin (e.g., front versus rear portions of the cabin, driver versus passenger portions of the cabin, etc.); (iii) heated seats; (iv) air conditioned seats; (v) ventilated seats with active air circulation; and (vi) heated steering wheel. The system of the invention may be configured to utilize these different heating and cooling functions in a variety of ways, for example based on (i) cabin temperature, (ii) the difference between the cabin temperature and the desired temperature, (iii) the difference between the cabin temperature and the ambient temperature, (iv) user preferences, (v) manufacturer settings, (vi) third party settings, etc.

In at least one embodiment of the invention the end-user or a third party, where the third party is preferably under the guidance of the end-user, is able to personalize many of the settings used during operation. Preferably this aspect of the invention is limited to thermal management of the passenger cabin, although in some embodiments the user is able to adjust other aspects of the battery pack thermal management system, such as how long battery pack conditioning is allowed prior to termination of the battery pack heating/cooling steps, thus allowing the user to trade-off power consumption versus battery pack efficiency. With respect to thermal management of the passenger cabin, allowing the user to at least partially configure the system provides a way for the user to perform such functions as customizing the temperature settings in accordance with their own comfort zone. Thus, for example, while some users may prefer to define a relatively narrow comfort zone, other users may prefer a wider comfort zone, thereby conserving power which, in the case of an EV, translates to a longer vehicle range.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of activating a thermal management system, the method comprising the step of:
   monitoring an operational state of a vehicle utilizing a vehicle system controller incorporated into the vehicle, said vehicle system controller comprising a central processing unit (CPU) and a memory, wherein the vehicle is on when said operational state corresponds to a first state, wherein the vehicle is off when said operational states corresponds to a second state, and wherein when said operational state corresponds to said second state the method further comprises the steps of:
   monitoring a plurality of conditions, wherein said plurality of conditions are selected from the group consisting of a driver location, a direction of driver movement relative to the vehicle, a vehicle location, a separation distance between the vehicle and a vehicle driver, a current time of day, a current day of week, a driver appointment schedule, a historical data base, and an alarm clock, wherein said monitoring step is performed by said vehicle system controller;
   determining a probability of the vehicle departing from a present location within a preset number of minutes from said current time based on said plurality of conditions monitored by said system controller, wherein said determining step is performed by said vehicle system controller; and
   comparing said probability to a preset probability, wherein if said probability is less than said preset probability said vehicle system controller continues to perform said steps of monitoring said plurality of conditions, determining said probability and comparing said probability for as long as said operational state of the vehicle corresponds to said second state, and wherein if said probability is greater than said preset probability said vehicle system controller performs the step of activating said thermal management system, said thermal management system coupled to a battery pack mounted within said vehicle.

2. The method of claim 1, wherein said step of monitoring said operational state of the vehicle further comprises the step of monitoring a vehicle on/off switch.

3. The method of claim 1, wherein said step of monitoring said operational state of the vehicle further comprises the step of monitoring proximity of said vehicle driver to the vehicle, wherein said operational state corresponds to said first state when said vehicle driver is within a passenger cabin of the vehicle, and wherein said operational state corresponds to said second state when said vehicle driver is outside of the passenger cabin of the vehicle.

4. The method of claim 1, wherein said driver location is monitored by said vehicle system controller by performing the step of monitoring a location corresponding to a smartphone.

5. The method of claim 1, wherein said driver appointment schedule is monitored by said vehicle system controller by performing the step of synchronizing an on-board calendar with a calendar contained on a remote system, wherein said remote system is selected from the group consisting of a cellular phone, a laptop computer, a tablet computer, a personal digital assistant, a computer system, or a network-based computing system.

6. The method of claim 5, wherein said calendar includes a plurality of successive appointments spanning a period of time, and wherein each appointment of said plurality of successive appointments has a corresponding appointment start time.

7. The method of claim 5, wherein said remote system is physically separate and independent of said vehicle, and wherein said step of synchronizing said on-board calendar with said calendar contained on said remote system is performed when said remote system is plugged into an on-board port coupled to said vehicle system controller.

8. The method of claim 5, wherein said remote system is physically separate and independent of said vehicle, and wherein said step of synchronizing said on-board calendar with said calendar contained on said remote system is performed when a wireless link is established between said remote system and said vehicle system controller.

9. The method of claim 1, further comprising the step of maintaining said historical data base, wherein said historical data base comprises a plurality of departure times and a plurality of time durations, wherein said plurality of departure times corresponds to a first plurality of locations, and wherein each time duration corresponds to a duration period of the vehicle residing at one of a second plurality of locations.

10. The method of claim 1, said step of activating said thermal management system further comprising the steps of:
   monitoring an elapsed time corresponding to said step of activating said thermal management system, wherein said step of monitoring said elapsed time is performed by said vehicle system controller; and comparing said elapsed time to a preset time interval, wherein said step of comparing said elapsed time to said preset time interval is performed by said vehicle system controller, wherein if said elapsed time is less than said preset time interval said vehicle system controller continues to perform said step of activating said thermal management system, and wherein if said elapsed time is greater than said preset time interval said vehicle system controller terminates said step of activating said thermal management system.

11. The method of claim 1, said step of activating said thermal management system further comprising the steps of:
monitoring a battery pack temperature sensor with said vehicle system controller;
determining a current battery pack temperature; and
comparing said current battery pack temperature to a preset temperature, wherein said step of comparing said current battery pack temperature to said preset temperature is performed by said vehicle system controller, wherein if said current battery pack temperature is lower than said preset temperature said step of activating said thermal management system further comprises the step of activating a battery pack heater.

12. The method of claim 11, said step of activating said battery pack heater further comprising the step of circulating heated air throughout said battery pack.

13. The method of claim 11, said step of activating said battery pack heater further comprising the steps of activating a heater coupled to a coolant circulation system and activating a coolant circulation pump, wherein said coolant circulation system is thermally coupled to said battery pack.

14. The method of claim 13, said step of activating said heater further comprising the steps of:
monitoring an elapsed time corresponding to said step of activating said heater, wherein said step of monitoring said elapsed time is performed by said vehicle system controller; and
comparing said elapsed time to a preset time interval, wherein said step of comparing said elapsed time to said preset time interval is performed by said vehicle system controller, wherein if said elapsed time is less than said preset time interval said system controller continues to perform said step of activating said heater, and wherein if said elapsed time is greater than said preset time interval said vehicle system controller terminates said step of activating said heater coupled to said coolant circulation system while continuing to perform said step of activating said coolant circulation pump, wherein said vehicle system controller performs the step of activating said coolant circulation pump for a preset period of time.

15. The method of claim 1, said step of activating said thermal management system further comprising the steps of:
monitoring a battery pack temperature sensor with said vehicle system controller;
determining a current battery pack temperature; and
comparing said current battery pack temperature to a preset temperature, wherein said step of comparing said current battery pack temperature to said preset temperature is performed by said vehicle system controller, wherein if said current battery pack temperature is higher than said preset temperature said step of activating said thermal management system further comprises the step of cooling said battery pack.

16. The method of claim 15, said step of cooling said battery pack further comprising the step of activating a battery pack air circulation system.

17. The method of claim 15, said step of cooling said battery pack further comprising the steps of activating a chiller coupled to a coolant circulation system and activating a coolant circulation pump, wherein said coolant circulation system is thermally coupled to said battery pack.

18. The method of claim 17, said step of cooling said battery pack further comprising the steps of:
monitoring an elapsed time corresponding to said step of cooling said battery pack, wherein said step of monitoring said elapsed time is performed by said vehicle system controller; and
comparing said elapsed time to a preset time interval, wherein said step of comparing said elapsed time to said preset time interval is performed by said vehicle system controller, wherein if said elapsed time is less than said preset time interval said vehicle system controller continues to perform said step of cooling said battery pack, and wherein if said elapsed time is greater than said preset time interval said system controller terminates said step of activating said chiller coupled to said coolant circulation system while continuing to perform said step of activating said coolant circulation pump, wherein said vehicle system controller performs the step of activating said coolant circulation pump for a preset period of time.

19. The method of claim 1, further comprising the step of providing a user interlace coupled to said vehicle system controller, wherein at least one of said preset number of minutes and said preset probability are settable by a user via said user interface.

* * * * *